(12) United States Patent
Lanzi et al.

(10) Patent No.: US 12,003,545 B2
(45) Date of Patent: Jun. 4, 2024

(54) SYSTEM ACCOUNT ACCESS MANAGER UTILIZING AN ENDPOINT DETECTION AND RESPONSE SYSTEM

(71) Applicant: Netwrix Corporation, Frisco, TX (US)

(72) Inventors: Paul Lanzi, San Francisco, CA (US); Timothy Keeler, San Francisco, CA (US)

(73) Assignee: Netwrix Corporation, Frisco, TX (US)

( * ) Notice: Subject to any disclaimer, the term of this patent is extended or adjusted under 35 U.S.C. 154(b) by 309 days.

(21) Appl. No.: 17/503,366

(22) Filed: Oct. 18, 2021

(65) Prior Publication Data

US 2022/0210199 A1 Jun. 30, 2022

Related U.S. Application Data

(60) Provisional application No. 63/131,056, filed on Dec. 28, 2020.

(51) Int. Cl.
*H04L 29/06* (2006.01)
*H04L 9/40* (2022.01)

(52) U.S. Cl.
CPC .......... *H04L 63/20* (2013.01); *H04L 63/0272* (2013.01); *H04L 63/102* (2013.01)

(58) Field of Classification Search
None
See application file for complete search history.

(56) References Cited

U.S. PATENT DOCUMENTS

2020/0106801 A1\* 4/2020 Evans .................... G06Q 40/08
2020/0153843 A1\* 5/2020 Aksela .................. G06N 20/00

\* cited by examiner

*Primary Examiner* — Andrew J Steinle
(74) *Attorney, Agent, or Firm* — Austin Rapp

(57) ABSTRACT

In one aspect, a computerized system includes an access manager server connected to one or more target computer systems. The access manager server is connected to the one or more target computer systems via an Endpoint Detection and Response (EDR) system. The EDR system continually monitors one or more target computer systems (e.g. endpoints) and responds to mitigate a cyber threat to the one or more target computer systems. The EDR system includes an EDR control plane that manages and communicates with one or more EDR agents. The EDR control plane causes a specific computer security action in the one or more target computer systems via one or more EDR agents. One or more EDR agents are installed in the one or more target computer systems. The one or more EDR agents are made available via the EDR API.

19 Claims, 14 Drawing Sheets

SYSTEM ACCOUNT ACCESS MANAGER UTILIZING AN ENDPOINT DETECTION AND RESPONSE SYSTEM

CLAIM OF PRIORITY

This application claims priority to U.S. Provisional Application No. 63/131,056, filed on 28 Dec. 2020, and titled SYSTEM ACCOUNT ACCESS MANAGER UTILIZING AN ENDPOINT DETECTION AND RESPONSE SYSTEM. This application is hereby incorporated by reference in its entirety.

FIELD OF THE INVENTION

The invention is in the field of computer security and more specifically to a method, system, and apparatus of methods of system account access manager utilizing an endpoint detection and response system.

DESCRIPTION OF THE RELATED ART

The embodiments herein relate generally to computer security or cybersecurity. As technology continues to grow, managing system accounts and computer security is increasingly difficult. Previously, systems are vulnerable to a number of credential-based attacks that would permit an intruder's unauthorized access. As a result, computer security breaches are rapidly on the rise. Prior solutions persist system accounts, leaving systems vulnerable to credential-based attacks. Other devices and systems use rotating passwords with shared accounts for protection. This leaves systems vulnerable if the password is shared or compromised. Using shared accounts introduces audit, compliance, and data-leakage problems.

SUMMARY OF THE INVENTION

In one aspect, a computerized system includes an access manager server connected to one or more target computer systems. The access manager server is connected to the one or more target computer systems via an Endpoint Detection and Response (EDR) system. The EDR system continually monitors one or more target computer systems (e.g. endpoints) and responds to mitigate a cyber threat to the one or more target computer systems. The EDR system includes an EDR control plane that manages and communicates with one or more EDR agents. The EDR control plane causes a specified action in the one or more target computer systems via one or more EDR agents. One or more EDR agents are installed in the one or more target computer systems. The one or more EDR agents are made available via the EDR API. Through the EDR API, the access manager server communicates a request to the EDR control plane to implement the various actions. The EDR API communicates the specified action from the access manager server to the EDR control plane. One or more target computer systems compromises computer hardware devices protected by a set of cyber security functionalities implemented by the access manager server.

Optionally, the EDR control plane may communicate to the access manager server via API. One or more target computer systems may compromise a computer virtual devices protected by a set of cyber security functionalities implemented by the access manager server.

Figure 1:
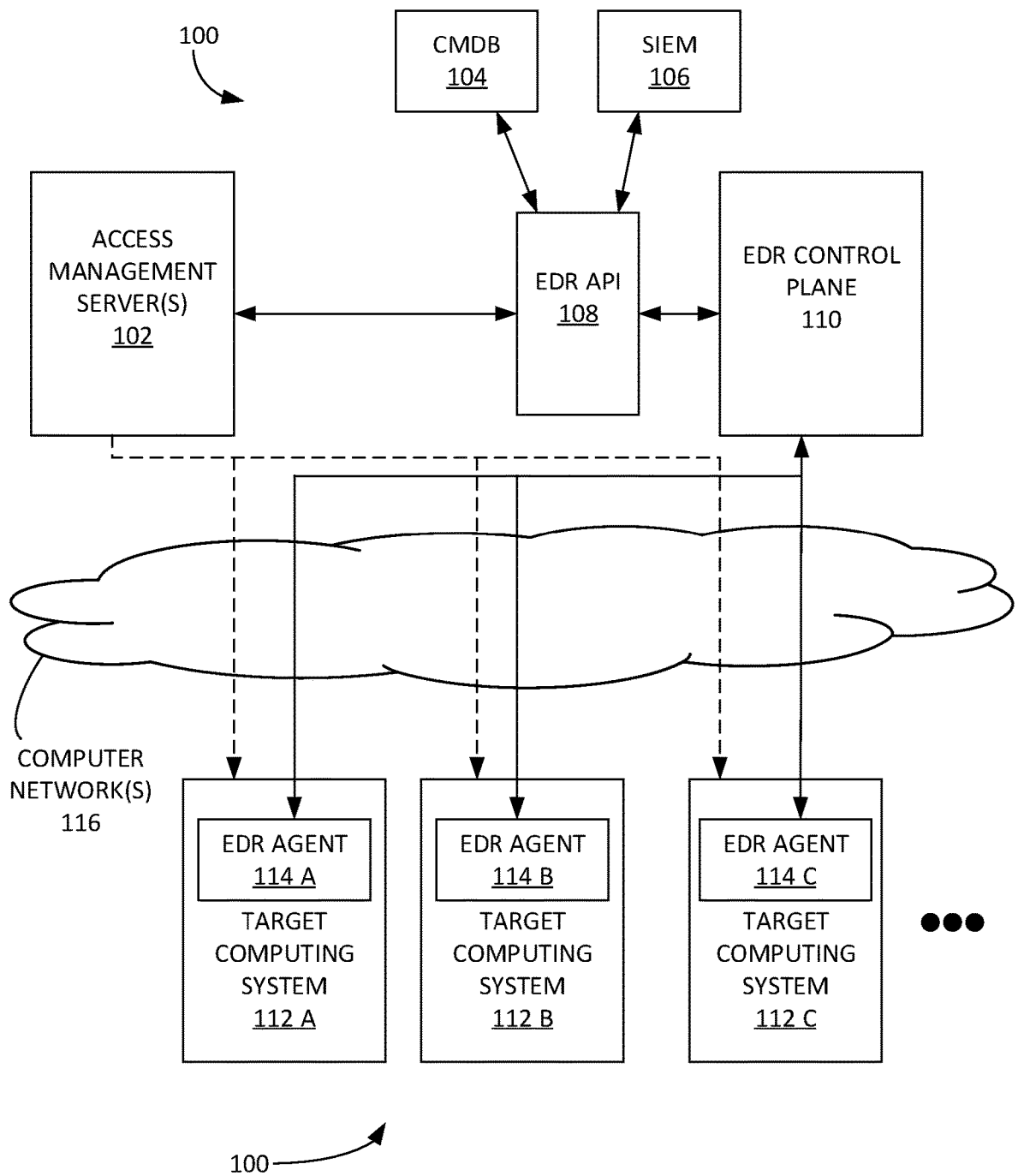
FIG. 1 illustrates an example system an access manager server connected to a target computer system(s) through a network, according to some embodiments.

The Figures described above are a representative set, and are not an exhaustive with respect to embodying the invention.

DESCRIPTION

Disclosed are a system, method, and article of a system account access manager utilizing an endpoint detection and response system. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Access manager server can be a computer-based tool that inventories, stores, manages and deletes privileged-access information.

Allowlisting explicitly allows some identified entities access to a particular privilege, service, mobility, access, or recognition on a computing system.

Blocklisting explicitly denies some identified entities access to a particular privilege, service, mobility, access, or recognition on a computing system.

Computer network can be a telecommunications network which allows computers to exchange data.

Configuration Management Database (CMDB) is a database used by an organization to store information about hardware and software assets. A CMDB database acts as a data warehouse for the organization and also stores information regarding the relationships among its assets. A CMDB can provide a means of understanding the organization's critical assets and their relationships (e.g. information systems, upstream sources or dependencies of assets, downstream targets of assets, etc.).

Computer system security action can be one or more processes executed, files modified or computer configurations modification related to the security of the computer system.

Endpoint Detection and Response (EDR) is a cyber technology that continually monitors and responds to mitigate cyber threats. This may also be known as an XDR.

Indicator of compromise (IoC) can be an artifact observed on a network or in an operating system that indicates a computer intrusion.

Layer 3 can be, in the seven-layer OSI model of computer networking, the network layer is layer 3. The network layer is responsible for packet forwarding including routing through intermediate routers.

Multi-factor authentication can enable confirmation of a user's claimed identity by utilizing a combination of several different components. In some examples, when two-factor authentication is discussed, it can be replaced by multi-factor authentication in other example embodiments.

Privileged-access information can be rules, definitions, lists or other data representations that are used by a computer operating system or application to determine which accounts (if any) are permitted to perform specific operating system or application functions restricted against use by non-privileged access users.

Privilege account management (PAM) can be a framework of policies and technologies for ensuring that the proper people in an enterprise have the appropriate access to technology resources.

Privileged user can be an account, assigned to a person or an application and accessed via human-readable tools or via computer code only (for example, an API), for which valid privileged-access information exists and which can thus execute functions restricted for use by privileged users.

Security information and event management (SIEM), software products and services combine security information management (SIM) and security event management (SEM). They provide can provide real-time analysis of security alerts generated by applications and network hardware.

Example Methods and Systems

Broadly, embodiments of the subject technology address problems with persistent account access. In one aspect, an embodiment may provide a process via software which can provision and remove account access on target systems for only the interval necessary. This approach solves problems with audit, compliance, data-leakage, and reduces the overall attack vector for credential-based attacks.

Referring now to FIG. 1, a system according to an exemplary embodiment of the subject technology generally includes an access manager server 102 connected to a target computer system(s) 112 A-C through computer network(s) 116. Target computer system(s) 112 A-C can be computer hardware devices protected by the cyber security functionalities implemented by access manager server 102. Access manager server 102 can also be connected to a target computer system(s) 112 A-C through EDR API 108. EDR API 108 can communicate with EDR control plane 110. EDR is a technology used to protect endpoints (such as target computer system(s) 112 A-C, etc.). EDR control plane 110 can manage EDR agents 114 A-C.

Accordingly, target computer system(s) 112 A-C can include EDR agents 114 A-C. EDR agents 114 A-C runs on target computer system(s) 112 A-C and make available EDR API 108. Through EDR API 108, access manager server 102 can ask EDR control plane 110 to implement various actions (e.g. see FIGS. 2-5 and additional use cases provided infra) on target computer system(s) 112 A-C running EDR agents 114 A-C. As used herein, 'EDR system' can include EDR API 108, EDR control plane 110 and EDR agents 114 A-C.

Access manager server 102 can communicates directly to target computer system(s) 112 A-C when a direct Layer 3 network connection cannot be established between an Account Access Manager and the target computer. For example, in this context, can implement the processes of FIGS. 2-5 directly. However, when the network line of sight is not available (e.g. a target computer is not using a VPN to connect to a specified network from a remote location, etc.), access manager server 102 can ask an EDR agent to implement task on the target computer. This is because the target computer remains exposed to the EDR API 108 via an indirect computer network (i.e. internet connection). For example, access manager server 102 can interface with the EDR system to manage privilege of access through these publicly accessible APIs.

Additionally, access manager server 102 can use EDR system to implement additionally use cases leveraging the various properties of the EDR system. Access manager server 102 can leverage EDR system to implement application allow-listing in target computer system(s) 112 A-C. Access manager server 102 can leverage EDR system to implement process level monitoring/logging in target computer system(s) 112 A-C. Access manager server 102 can leverage EDR system to add/remove accounts from accessing target computer system(s) 112 A-C. Access manager server 102 can leverage EDR system to implement dynamic privilege management (e.g. temporarily giving privileges to a specified user) in target computer system(s) 112 A-C. Access manager server 102 can leverage EDR system to implement account management in target computer system(s) 112 A-C. This can include setting a password for an account, etc. Additional use cases are provided in the description of FIGS. 8-16, infra.

Access manager server 102 can leverage EDR system to establish a health state (e.g. from a cyber security point of view) of target computer system(s) 112 A-C before granting privileged access. For example, Access manager server 102 can determine with an applicable EDR agent that an end point has been compromised. When a compromised end point is detected, an entity managing EDR system can request that access manager server 102 revoke privileged access for any potentially compromised user(s).

Access manager server 102 can leverage EDR system to for geofencing operations. For example, EDR system return geodata (e.g. IP based geo data) to access manager server 102 via EDR API 108.

Access manager server 102 can leverage EDR system to discovery/assess risk events in target computer system(s) 112 A-C. Access manager server 102 can periodically call on EDR API 108 and collect risk event data. Alternatively, EDR system can also set an event and notify access manager server 102 about any specific security events are detected by EDR agents 114 A-C in an end point. In this way, EDR system can provide a mechanism whereby access manager server 102 is made aware of all relevant security events.

Access manager server 102 can leverage EDR system to register new endpoints. EDR system can provide reports about current managed assets to access manager server 102 (e.g. can reinitiate reinstallation of an EDR agent for the EDR entity, etc.). Access manager server 102 can EDR system to repair and/or deploy applications running on target computer system(s) 112 A-C.

EDR system can use access manager server 102 to revoke Just-In-Time Privileged Access Management (JITA) rights of systems that access target computer system(s) 112 A-C.

EDR system can privilege specific applications using an allowlisting protocol that includes a JITA database managed by access manager server 102. For example, access manager server 102 can inform an EDR agent that a user can access a specified application during a JITA session of access manager server 102.

Access manager server 102 can (e.g. in combination with EDR Control Plane 110) provide zero trust protection. Privileged access on a just-in-time, just-enough basis using two-factor authentication, delivering total privileged access security. Access manager server 102 can provide real-time (e.g. assuming networking and processing latencies, etc.) breach detection. Access manager server 102 can provide integration with SIEM system(s) 106. SIEM system(s) 106 can enables instant detection of privileged access escalation and rapid response to potential risks.

Access manager server 102 can enable compliance management. Users operate under one identity. This can enable delivery of an efficient audit process and greater governance across the enterprise. Access manager server 102 can provide an agent-less platform reduces the quantity of privileged access across an enterprise. Administrators can be provided on-demand access to only the systems they need, for just the time they need it (e.g. via Just-In-Time Privileged Access Management (JITA) rights) and using their own user account.

Access manager server 102 can use the EDR system to expand the set of functionalities and processes available. Therefore, it is noted that these functionalities and processes can be implemented even when the target computer is not in the network line of sight of access manager server 102. Accordingly, access manager server 102 can provide a dashboard that enables administrators to implement the proceeding functionalities and processes via the EDR system. It is noted that additional use cases are provided in the descriptions of FIGS. 8-14.

Computer network(s) 116 can include, inter alia: the Internet, cellular data networks and the like.

Configuration Management Database (CMDB) 104 can be a database used by an organization managing access manager server 102 to store information about hardware and software assets.

Figure 2:
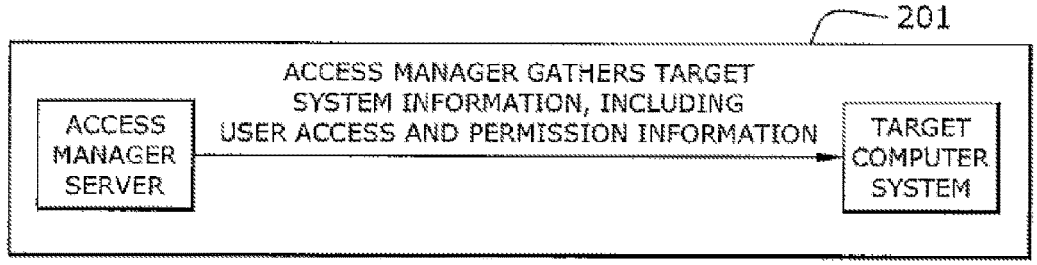
FIGS. 2-4 illustrate workflows for managing account access according to an embodiment of the subject technology, according to some embodiments.
Figure 3:
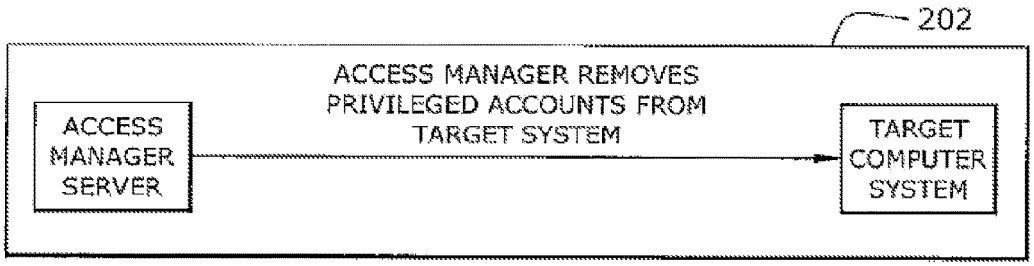
Figure 4:
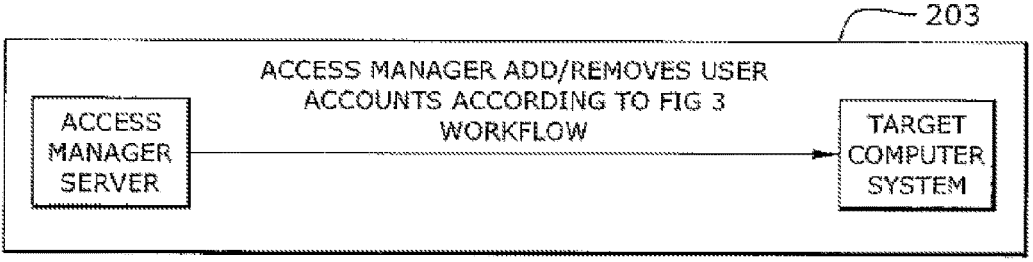

Referring now to FIGS. 2-4, access manager server 102 may be configured to function according to the following to reduce vulnerability at target computer system(s) 112 A-C. These processes can utilize an EDR system to access target computer system(s) 112. Access manager server 102 gathers target system information through the computer network(s) 116 and/or EDR system, including user access and permission rights (e.g. FIG. 2). Access manager server 102 removes privileged accounts from the target systems (e.g. FIG. 3). Access manager server 102 can now add and/or remove privileged accounts on target computer system(s) 112 A-C on a per-needed basis as requested by a user (for example, a network administrator) through access manager server 102.

Figure 5:
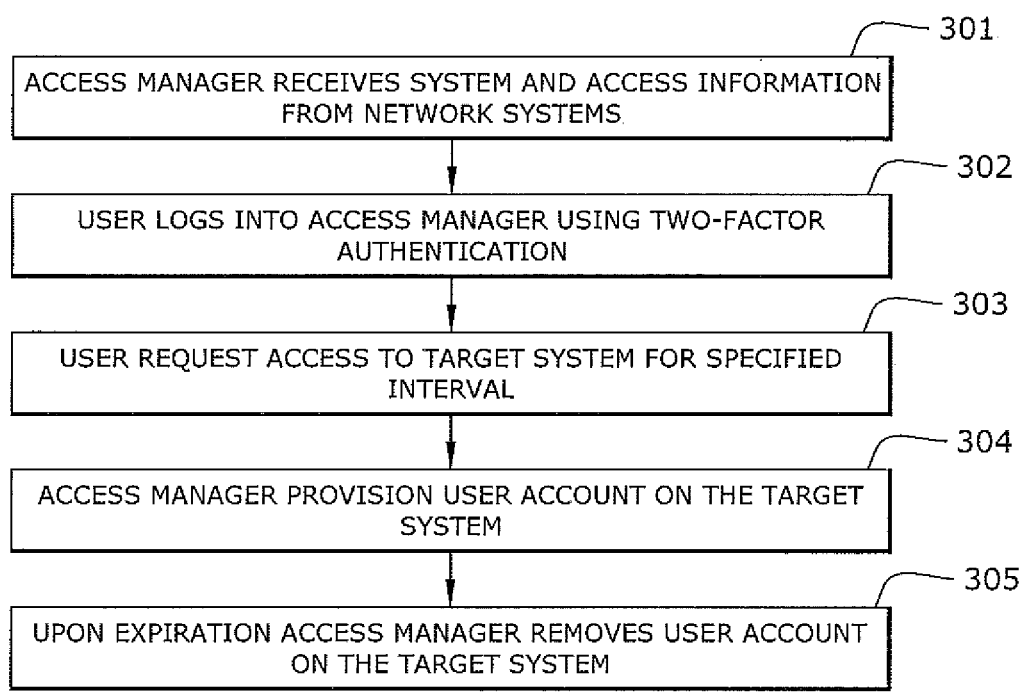
FIG. 5 illustrate a flowchart of a method of managing account access according to an embodiment of the subject technology, according to some embodiments.

FIG. 5 describes a method of managing account access according to an embodiment of the subject technology at a lower level of the process than FIGS. 2-4. In block 301, access manager server 102 gathers privileged access information from the target systems on the network (e.g. leveraging the EDR system when the target system is not available via a network line of sight, etc.). This information is stored in a secure database on access manager server 102 and used to authorize user access to the target system. Once the information is gathered from the target system, access manager server 102 removes the existing account access from the target system. From this point on, the privileged user can use access manager server 102 to gain access to the target system. In block 302, a user may log into access manager server 102 using multi-factor authentication (e.g. two-factor authentication, more than two factor authentication, etc.). When a privileged user requests target system access (block 303) via access manager server 102, access manager server 102 verifies access is allowed. Upon verification, in block 304 access manager server 102 adds the privileged user's account to the target system for an interval specified by access manager server 102 (for example, 4 hours). During this period, the privileged user may log on to the target system. After the period expires access manager server 102, in block 305 removes the user's account access from the target system, restoring the system to a secured state.

Figure 6:
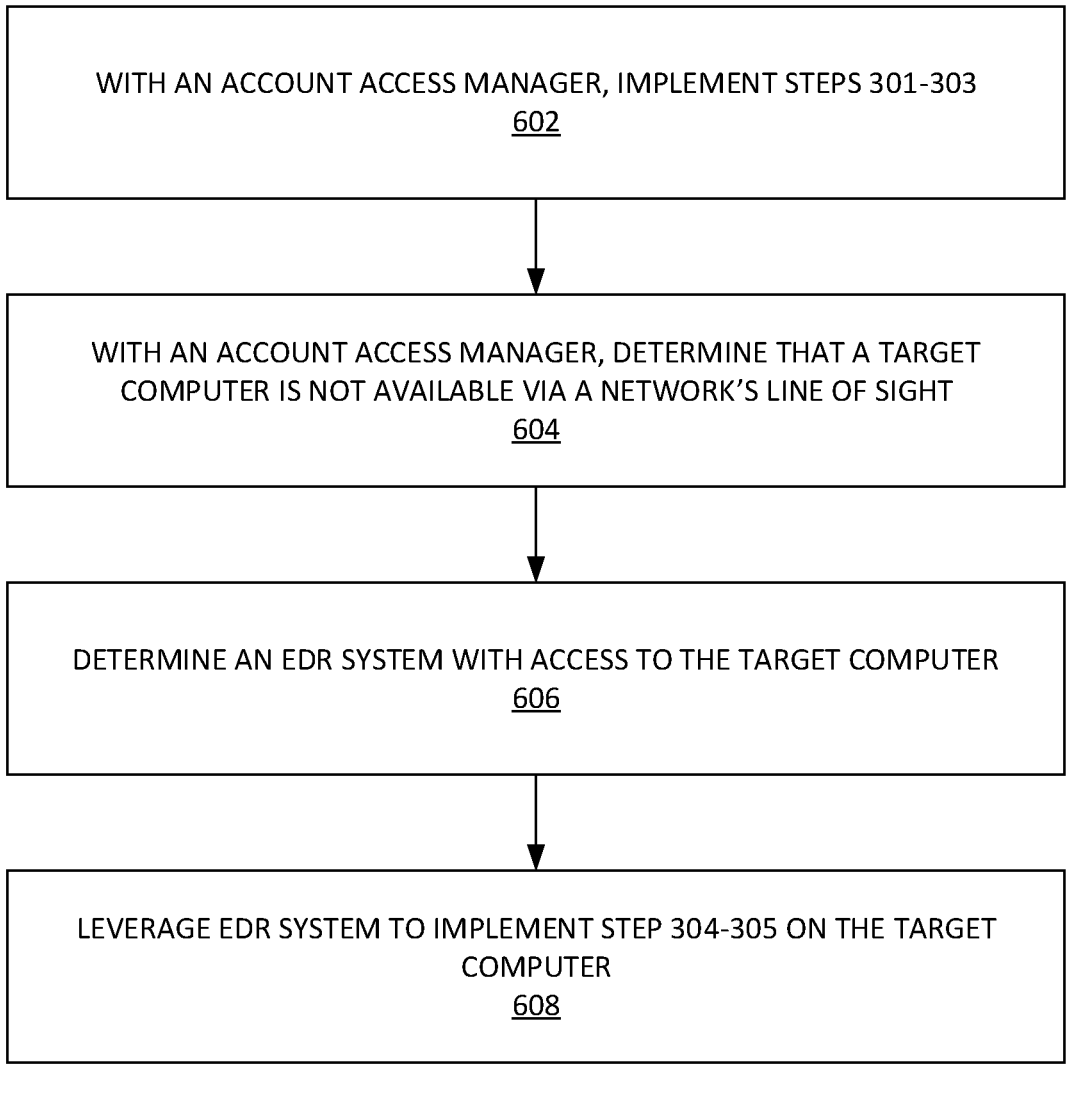
FIG. 6 illustrates an example process for implementing process via an EDR system when a direct Layer 3 network connection cannot be established between the Account Access Manager and the target computer, according to some embodiments.

FIG. 6 illustrates an example process 600 for implementing process 500 via an EDR system when a direct Layer 3 network connection cannot be established between an Account Access Manager and the target computer, according to some embodiments.

Figure 7:
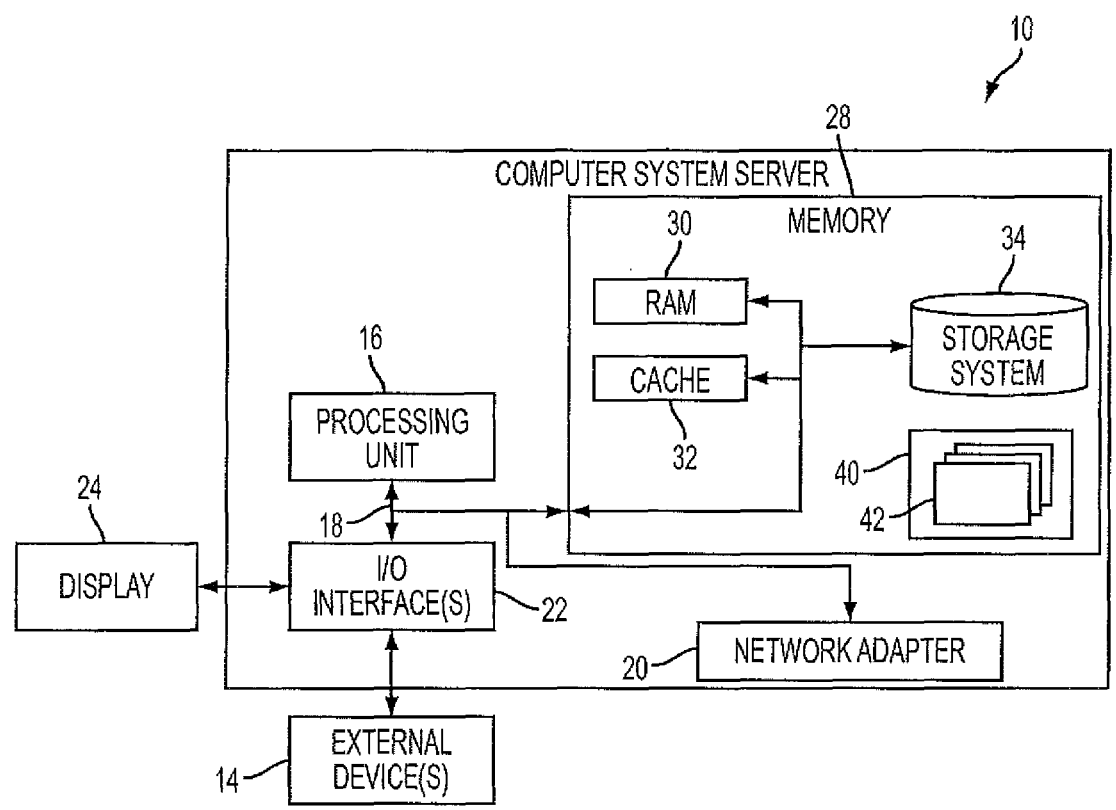
FIG. 7 is a block diagram of a sample-computing environment that can be utilized to implement some embodiments.

Referring to FIG. 7, a computer system/server 10 is described in more detail in terms of the machine elements that provide functionality to the systems and methods disclosed herein. Access manager server 102 and/or target computer system(s) 112 A-C may function according to aspects of the computer system/server 10. The components of the computer system/server 10 may include, but are not limited to, one or more processors or processing units 16, a system memory 28, and a bus 18 that couples various system components including the system memory 28 to the processor 16. The computer system/server 10 may typically include a variety of computer system readable media. Such media could be chosen from any available media that is accessible by the computer system/server 10, including non-transitory, volatile, and non-volatile media, removable and non-removable media. The system memory 28 could include one or more computer system readable media in the form of volatile memory, such as a random-access memory (RAM) 30 and/or a cache memory 32. By way of example only, a storage system 34 can be provided for reading from and writing to a non-removable, non-volatile magnetic media device typically called a "hard drive" (not shown).

The system memory 28 may include at least one program product 40 having a set (e.g., at least one) of program modules 42 that are configured to carry out the functions of embodiments of the invention. The program product/utility 40, having a set (at least one) of program modules 42, may be stored in the system memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein. For example, the program modules 42 may carry out the steps for accessing the target computer systems(s) 112 A-C, removing privileged accounts from the system, receiving access requests from privileged accounts, verifying authorized access, tracking logged in time by an account, and disconnecting access after expiration of an authorized time being logged in to the target computer system 112 A-C.

The computer system/server 10 may also communicate with one or more external devices 14 such as a keyboard, a pointing device, a display 24, etc.; and/or any devices (e.g., network card, modem, etc.) that enable the computer system/server 10 to communicate with one or more other computing devices. Such communication can occur via Input/Output (I/O) interfaces 22. Alternatively, the computer system/server 10 can communicate with one or more networks such as a local area network (LAN), a general wide area network (WAN), and/or a public network via a network adapter 20. As depicted, the network adapter 20 may communicate with the other components of the computer system/server 10 via the bus 18.

It is noted that, with respect to a network line of sight, an access manager server and a target computer are able to successfully establish ongoing two-way communication using pre-established common network protocols. The two-way communication continues unhindered for the duration of the computer system security action and is successfully concluded by both the access manager server and the target computer.

Additional Embodiments

Figure 8:
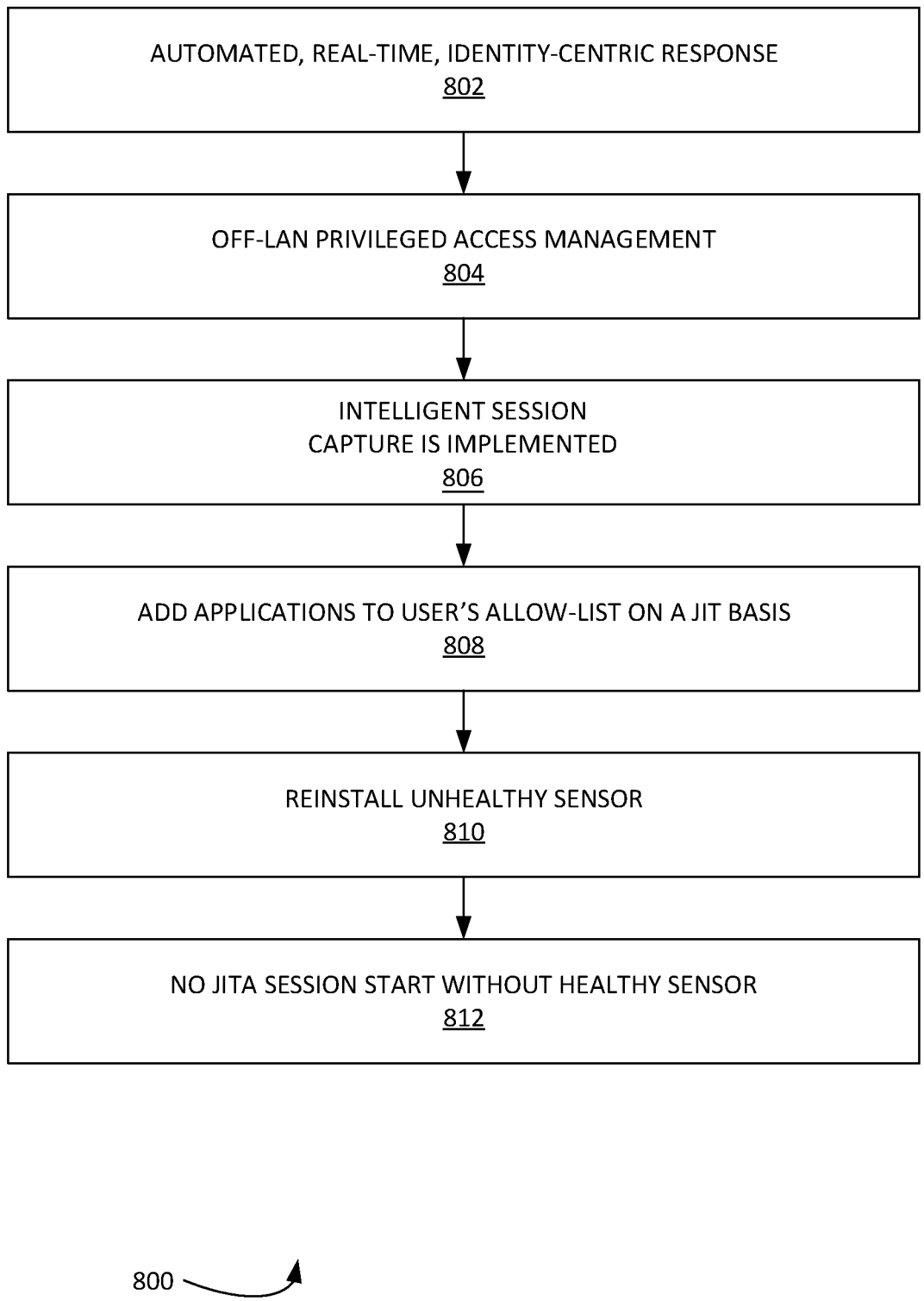
FIG. 8 illustrates an example process utilized by access manager server, according to some embodiments.

FIG. 8 illustrates an example process 800 utilized by access manager server 102, according to some embodiments. Access manager server 102 can use process 800 with an EDR system to expand the set of available functionalities and processes. In step 802, process 800 can implement automated, real-time, identity-centric response. When an EDR agent detects a compromise on an endpoint, process 800 can strip any at-risk accounts of their privileged access immediately.

In step 804, process 800 can implement off-LAN privileged access management. Using the EDR agent, process 800 can scan, allocate and end JITA sessions on endpoints that are not directly reachable by process 800.

In step 806, process 800 can implement intelligent session capture. Process 800 administrators can access process-level information captured by the EDR agent during JITA sessions directly through EDR visualization tools.

In step 806, process 800 can add applications to a user's allow-list on a JIT basis. Infosec administrators can create custom application allow-list and blocklist policies that are applied to an endpoint when a user starts or ends a JITA session.

In step 810, process 800 can reinstall unhealthy sensor. When the EDR determines that a sensor on an endpoint is unhealthy, it can request JIT administrator rights from process 800 in order to reinstall the sensor (e.g. which requires administrator rights).

In step 812, process 800 can ensure that no JITA session starts without healthy sensor. Process 800 confirms that there is a healthy EDR sensor on the endpoint (to ensure step 806) before starting a session or reinstalls (e.g. step 805) the sensor before starting the JITA session.

Figure 9:
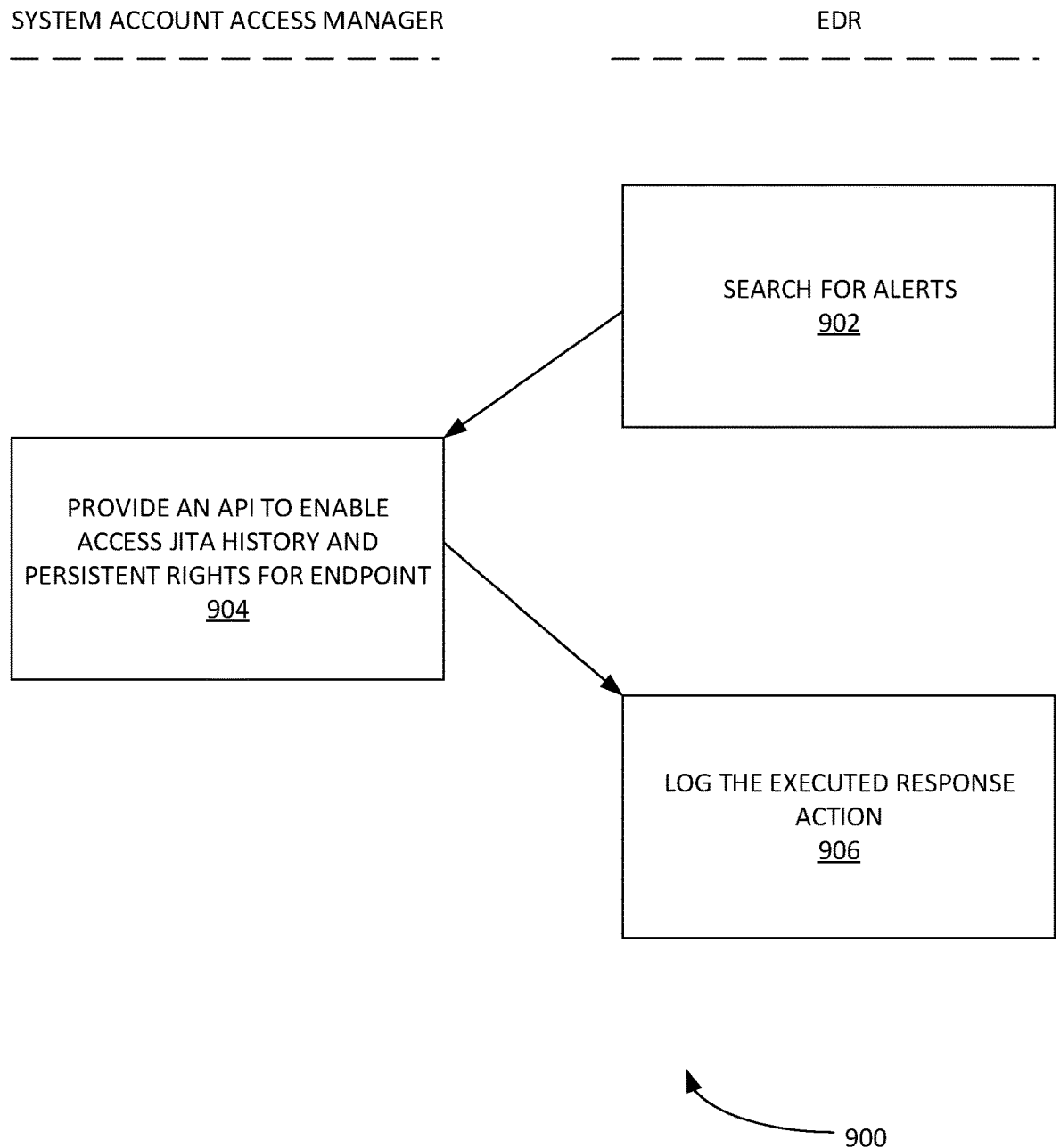
FIG. 9 illustrates an example use case for automated, near-real-time, identity-centric response, according to some embodiments.

FIG. 9 illustrates an example use-case process 900 for automated, near-real-time, identity-centric response, according to some embodiments. It is noted EDR solutions have indicator of attack (IOA) detection capabilities, but are device-centric and are generally reactive. Additionally, PAM solutions can have deep control over the state of privileged access but may not have IOA detection capabilities. Additionally, file-less malware, 'live-off-the-land' and other attacks of all types generally can require privileged access to spread laterally in the network. Revoking privileged access for compromised accounts (e.g. based on IOCs on compromised device) allows infosec teams to proactively shutdown malware spread through automation. EDR detects an IOC on an endpoint and informs process 800. Process 800 revokes any present privileged access (e.g. JITA or persistent) for any account that has had privileged access on the compromised endpoint in the last n-days (e.g. 90 days, etc.). Malware can no longer use compromised credentials to spread laterally.

More specifically, in step 902, process 900 can search for alerts. For example, process 900 can poll a customer's s3 bucket (e.g. as received from an event forwarder). Process 900 can poll EDR API and obtain filtered data back about alerts.

In step 904, process 900 can provide a system-account-access manager API to enable access JITA history and persistent rights for endpoint. Process 900 can also remove active rights for any implicated accounts.

In step 906, process 900 can log the executed response action.

Figure 10:
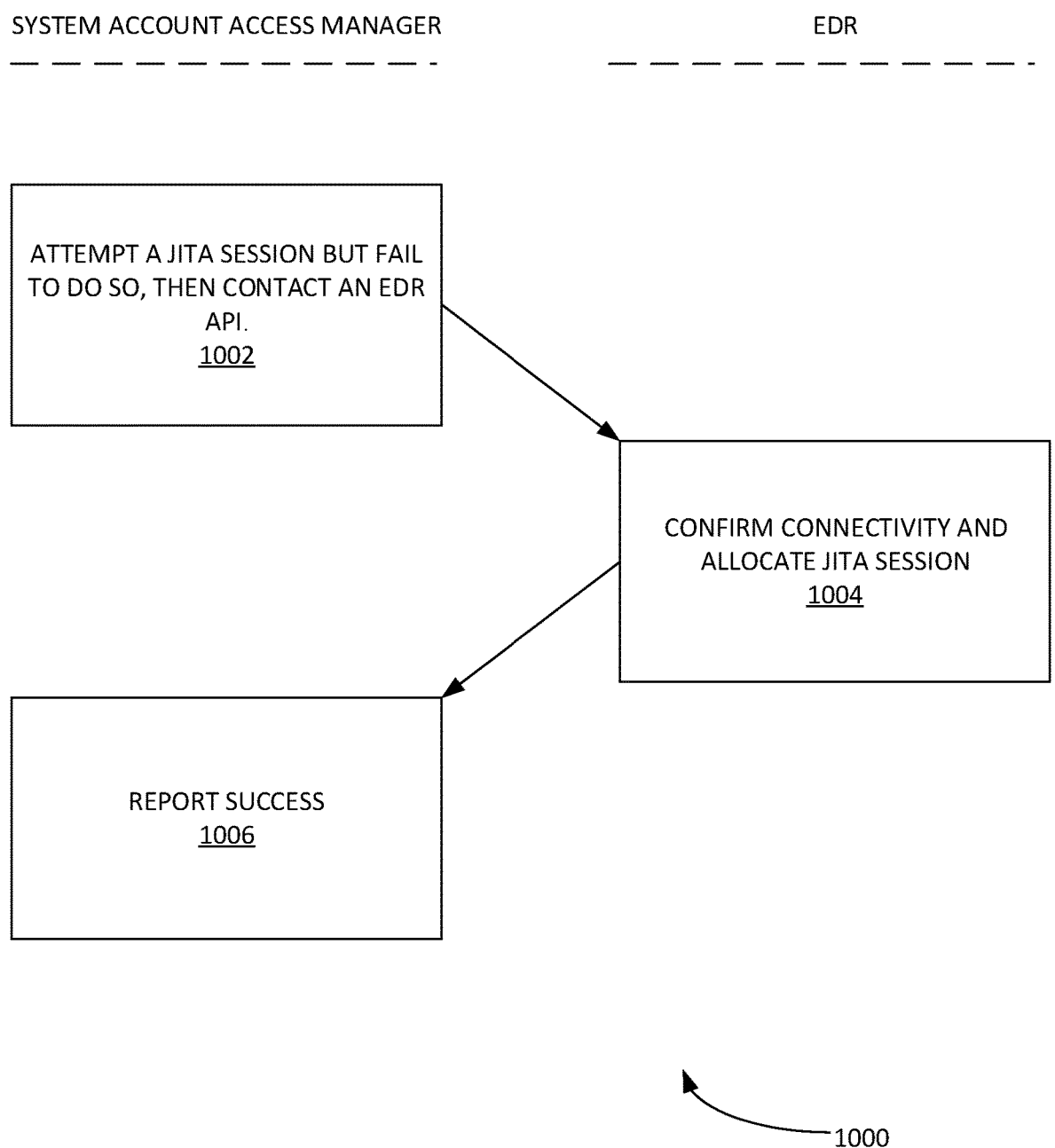
FIG. 10 illustrates an example use-case process for implementing off-LAN privileged access management, according to some embodiments.

FIG. 10 illustrates an example use-case process 1000 for implementing off-LAN privileged access management, according to some embodiments. Process 1000 can attempt to directly connect to an endpoint to scan, allocate or revoke privileged access, but is then unable to connect. Process 1000 can then ask the EDR if it has connectivity to the endpoint; if it does, process 1000 relays the command through the EDR to the endpoint and the EDR relays the response back. The EDR can have a flexible APIs that allow commands to be executed on endpoints through their WAN-based network connection. It is noted that scanning and JITA are now possible whenever the EDR can connect.

In step 1002, with a system-account-access manager API, process 1000 can attempt a JITA session but fail to do so. Process 1000 can then contact an EDR Live Response API.

In step 1004, the EDR's API can confirm connectivity and allocate the JITA session.

In step 1006, system-account-access manager API can report a success and implement other relevant steps.

Figure 11:
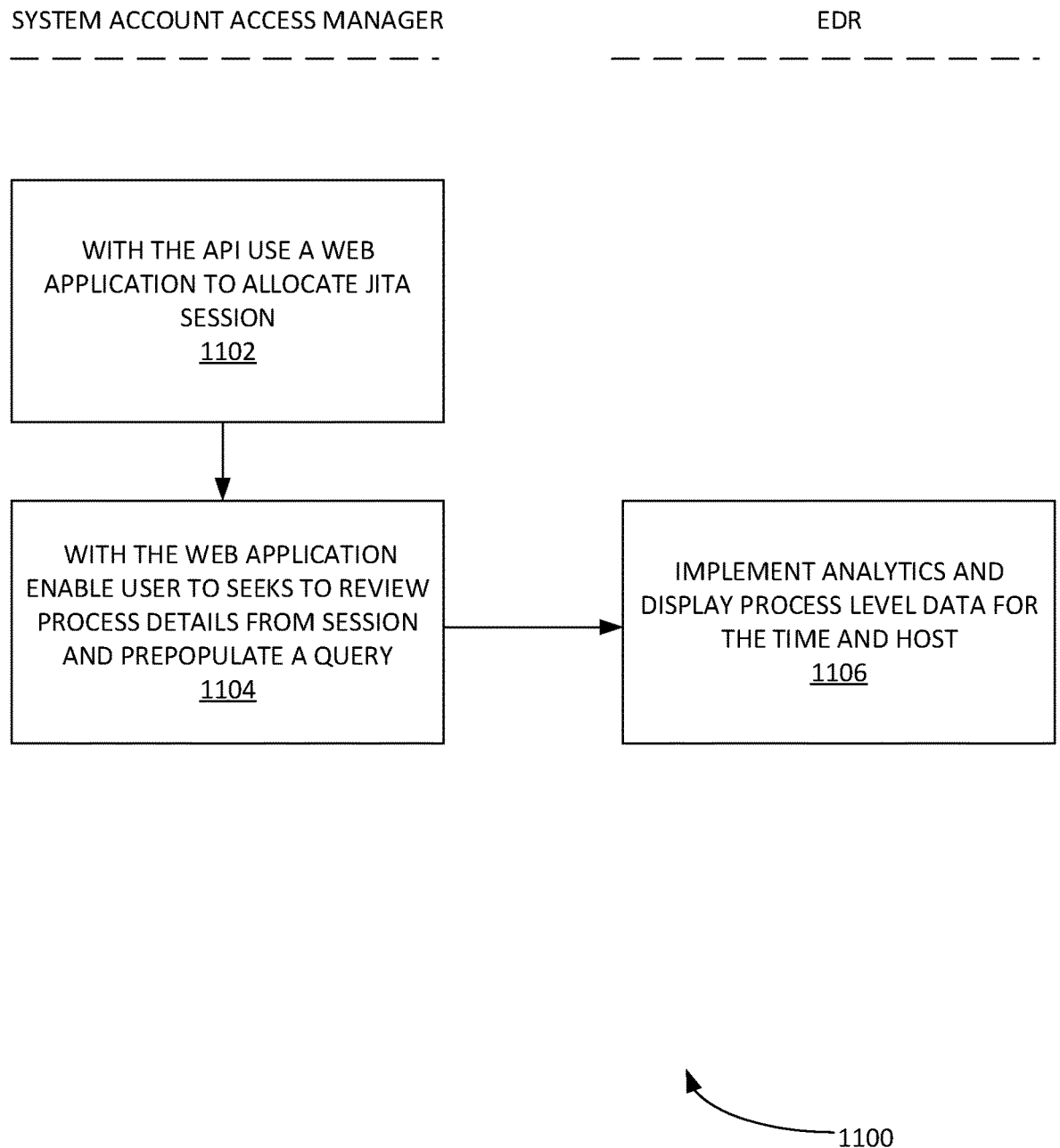
FIG. 11 illustrates an example use-case process for Intelligent Session Capture, according to some embodiments.

FIG. 11 illustrates an example use-case process 1100 for Privileged Session Logging, according to some embodiments. In the JITA (Just In Time Admin) session logs and UI, a hyperlink can be rendered for each session that deep-links into the EDR's process-level data visualization tool for that specific JITA session (e.g. start time, end time, endpoint). This enables forensic investigators to view what processes were executed, files were modified, etc. during any JITA session.

In step 1102, process 1100 can, with system-account-access manager API, use a web application to allocate JITA session.

In step 1104, with the Web Application, enable the user to search and review process details from session and prepopulate a query.

In step 1106, implement analytics and display process and file level data for the time and host.

Figure 12:
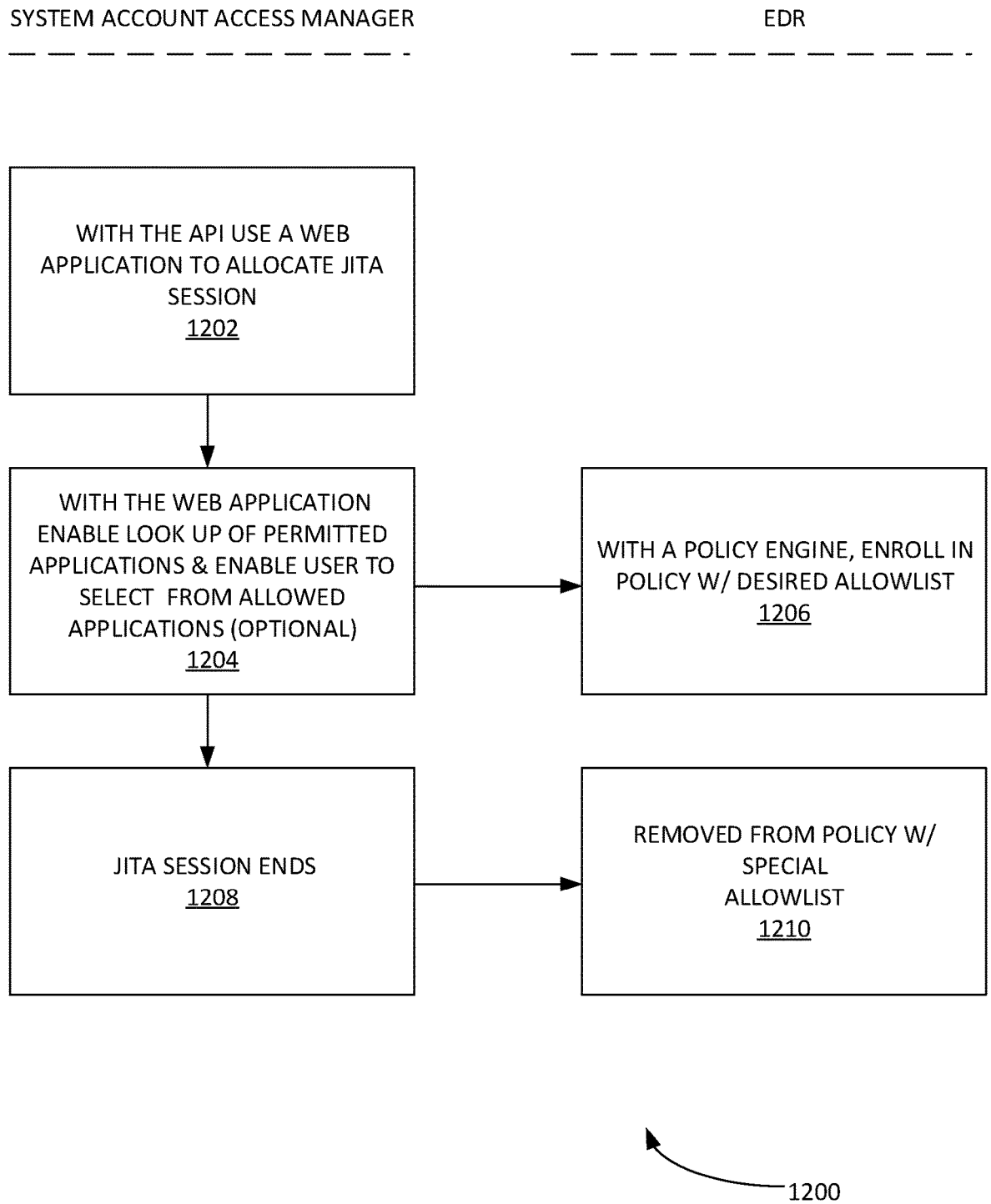
FIG. 12 illustrates an example use-case process for JIT application allowlisting and blocklisting, according to some embodiments.

FIG. 12 illustrates an example use-case process 1200 for JIT application allowlisting, according to some embodiments. It is noted that process 1200 can provide the system-account-access manager A with strong JIT capabilities and with the ability to define policies in both identity-centric and endpoint-centric ways. The system-account-access manager can enable application allowlisting/blocklisting. JIT allowlisting/blocklisting can enable the jobs of privileged access users easier while significantly increasing endpoint security for non-privileged users. When a JITA session starts, the user can select which applications (and/or which sets of applications) they wish to allowlist for themselves during that JITA session. Alternately, policies can be created ahead of time by the infosec team and the user can select from pre-defined policies. As needed, dynamic policies can be created with custom allow/block lists and the target endpoint enrolled and disenrolled (JIT) from the dynamic policy.

More specifically, process 1200 can, in step 1202, with the API use a Web Application to Allocate JITA Session. In step 1204, with the web application of the system-account-access manager, enable look up of permitted applications and enable user to select from allowed applications (optional). In step 1206, with a Policy Engine of the EDR, process 1200 enrolls in a policy with the desired allowlist. In step 1208, process 1200 ends the JITA session. In step 1210, process 1200 implements a removal from of the policy with the special allowlist.

Figure 13:
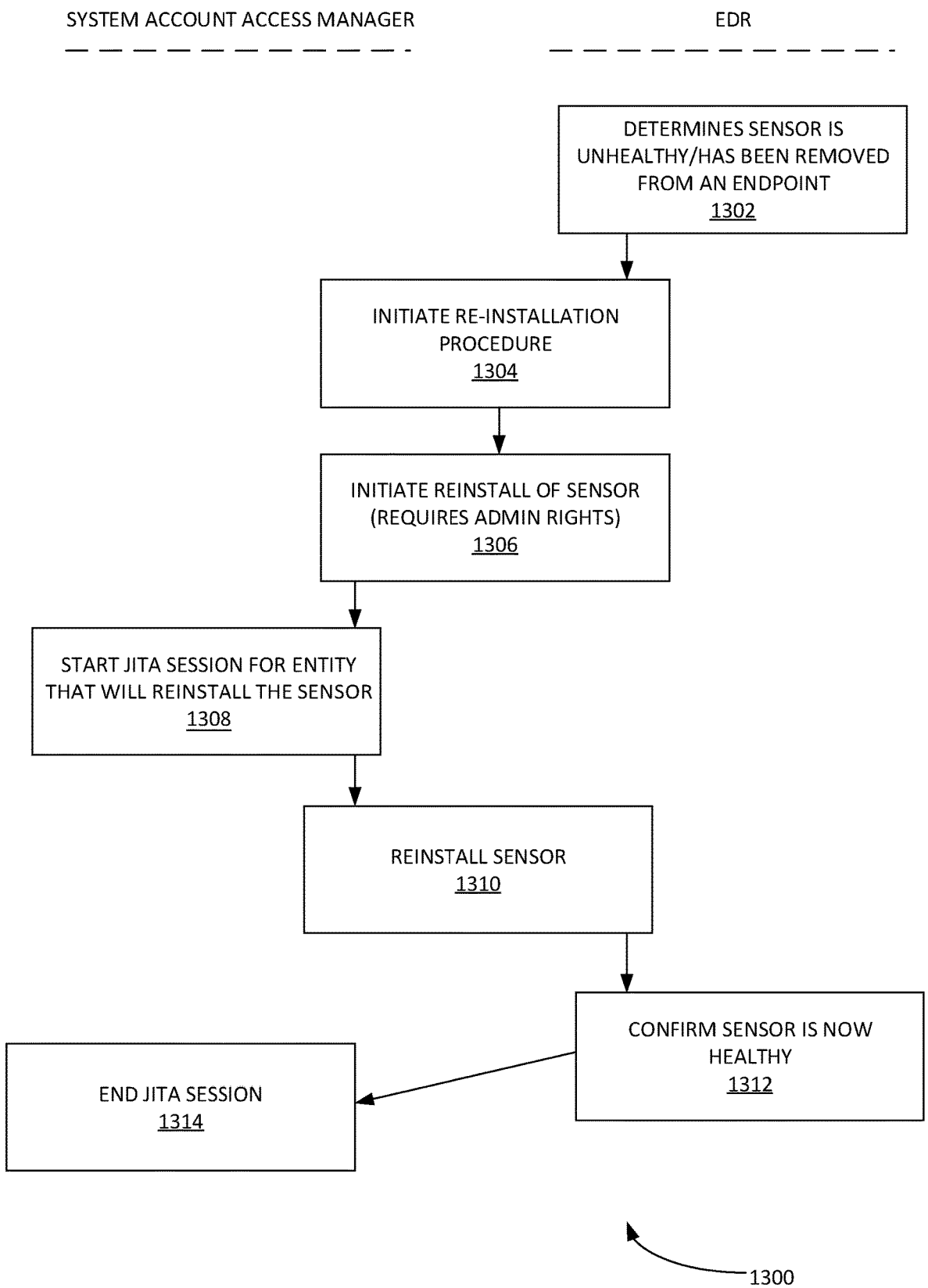
FIG. 13 illustrates an example use-case process for a sensor reinstall, according to some embodiments.

FIG. 13 illustrates an example use-case process 1300 for a sensor reinstall, according to some embodiments. Process 1300 can allocate the needed privileged access to the EDR solution or other entity to reinstall the EDR agent/sensor on a JIT basis. This can permit the EDR solution to self-heal, or other entity to heal the EDR solution, and reduces IT administrator burden. Process 1300 can provide the JITA capability such that no additional domain-level administrator access rights need to be granted. Process 1300 can manage privileged access (and/or grant JITA) on non-domain-joined endpoints as well.

When the EDR solution detects that the agent/sensor is in an unhealthy state, it can begin a 'heal' workflow (e.g. either in the EDR solution or in some other tool). As part of the heal workflow, JITA rights can be granted to the automation user on the affected endpoint, and that automation user reinstalls the sensor. At the conclusion of the install, the JITA rights can be revoked.

More specifically, in step 1302, process 1300 can determine that a sensor is unhealthy/has been removed from an endpoint.

In step 1304, process 1300 can initiate re-installation procedure. In step 1306, process 1300 can initiate reinstall of sensor. This may require administrator rights.

In step 1308, process 1300 can start the JITA session for the entity that implements reinstallation of the sensor.

In step 1310, process 1300 can reinstall the sensor.

In step 1312, process 1300 can confirm sensor is now healthy.

In step 1314, process 1300 can end the JITA session.

Figure 14:
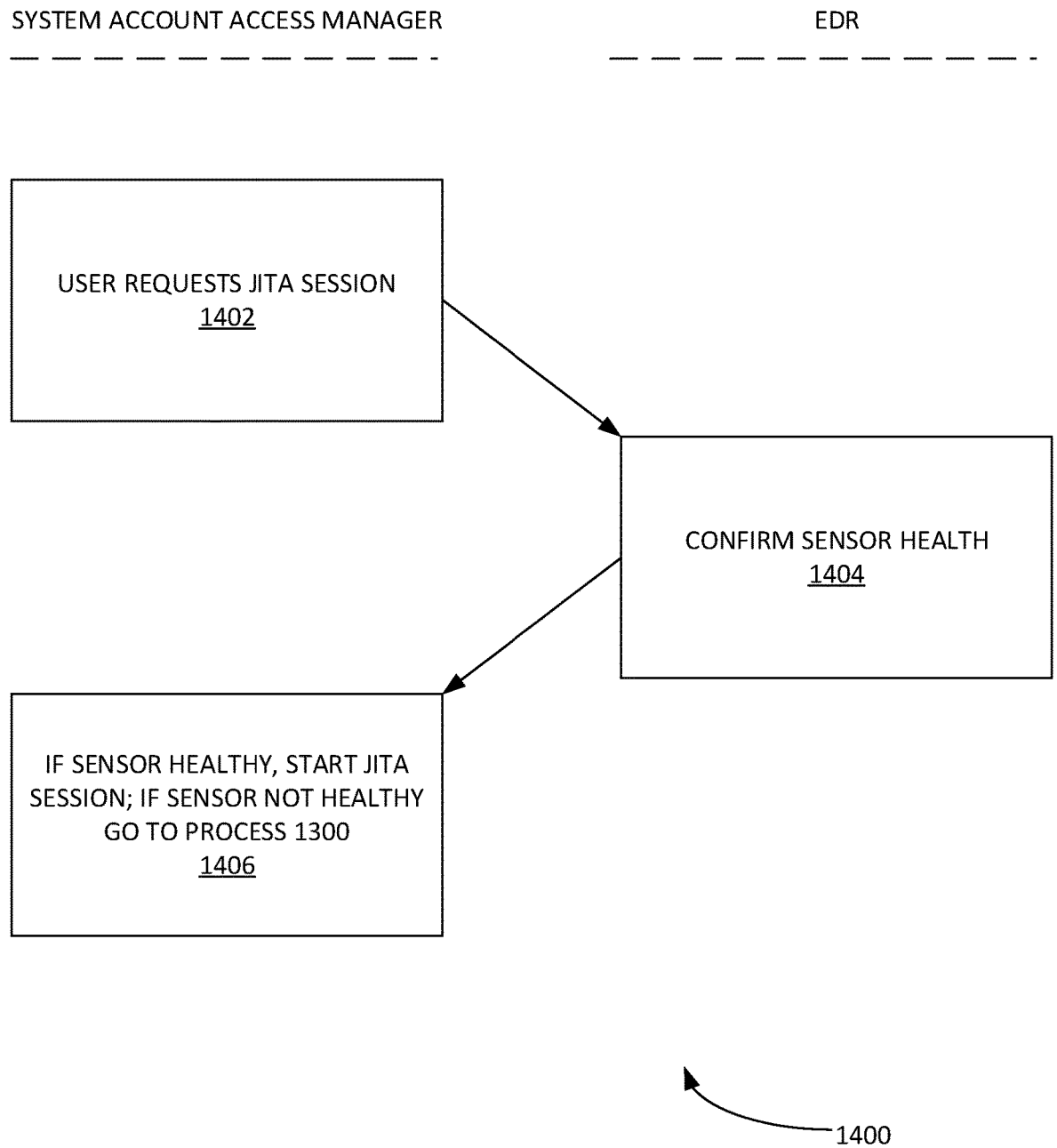
FIG. 14 illustrates an example use-case process when there is no JITA and without a healthy sensor, according to some embodiments.

FIG. 14 illustrates an example use-case process 1400 when there is no JITA permitted without a healthy sensor, according to some embodiments. Before starting a JITA session, process 1400 can confirms via an API call to the EDR that the sensor/agent is in a healthy state. If it is healthy, the JITA session starts as normal. If it is not healthy, depending on customer configuration, a reinstallation may be triggered and/or the JITA session may be denied and/or the JITA session may start but a warning can be provided to the user.

In step 1402, process 1400 can request a JITA session.

In step 1404, process 1400 can determine if the sensor is healthy.

In step 1406, process 1400 can start a JITA session if the sensor is healthy. If the sensor is unhealthy, then process 1400 initiates process 1300.

Figure 15:
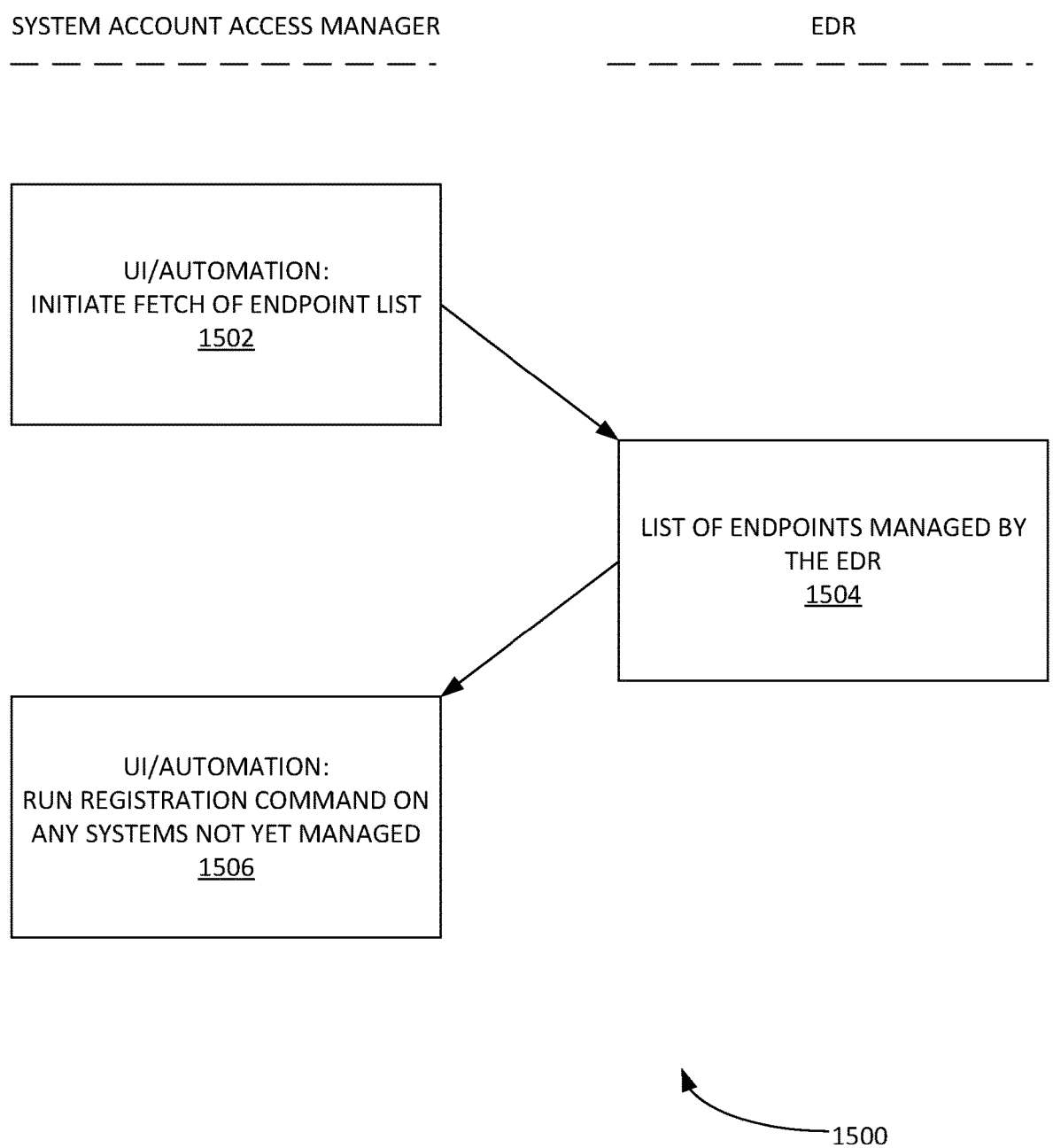
FIG. 15 illustrates an example use-case process of new computer discovery via EDR, according to some embodiments.

FIG. 15 illustrates an example use-case process 1500 of new computer discovery via EDR, according to some embodiments. Process 1500 can probe the EDR solution's endpoint list, comparing it with an endpoint list and discovery any differences. Then, on any endpoints where access manager server 102 is not currently operating, process 1500 can implement a registration via EDR to begin using access manager server 102 on those endpoints. More specifically, in step 1502, process 1500 can initiate a fetch of an endpoint list. In step 1504, process 1500 can list of endpoints managed by the EDR. In step 1506, process 1500 can run a registration command on any systems not yet managed.

Figure 16:
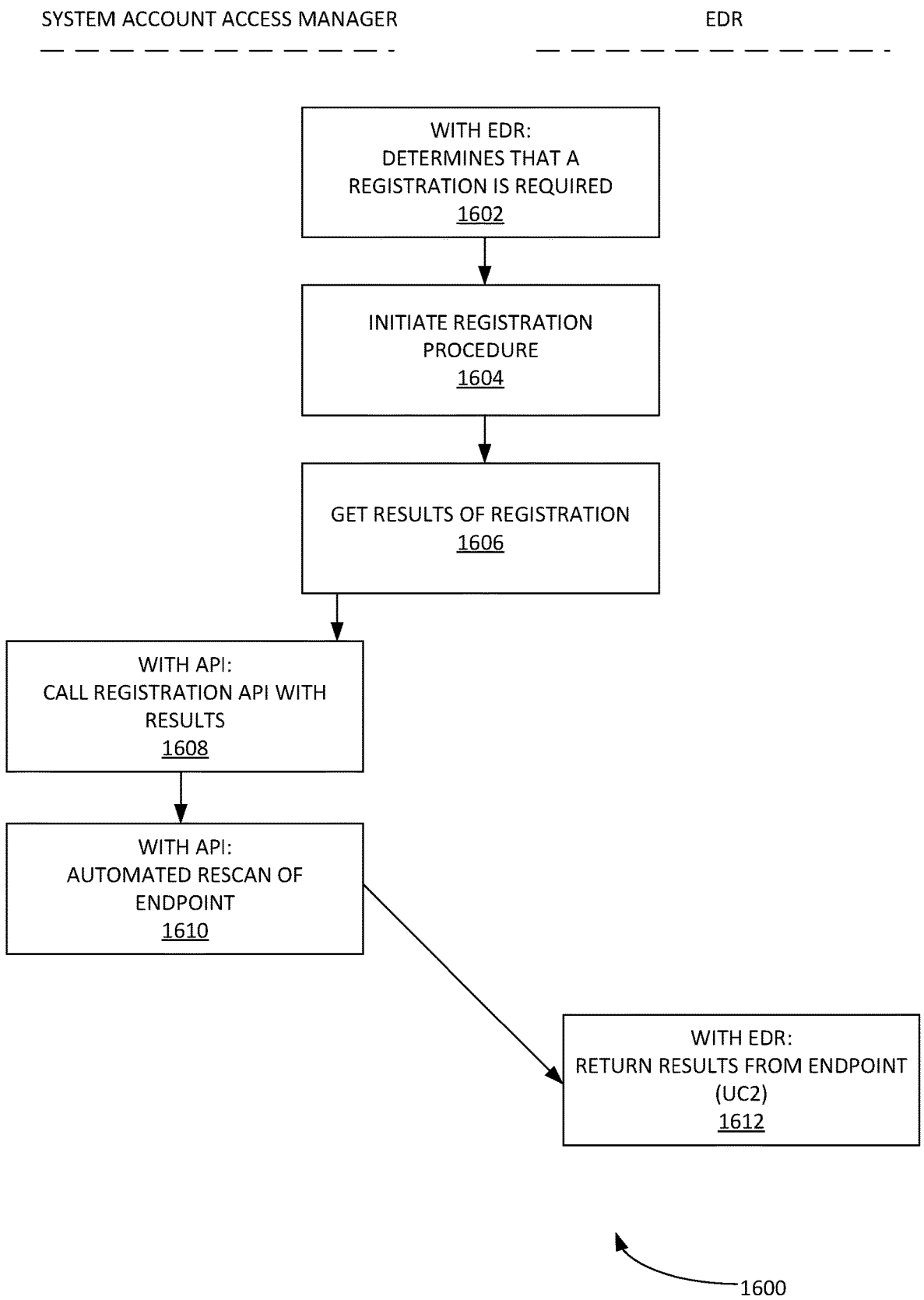
FIG. 16 illustrates an example process for implementing a registration script on an endpoint, according to some embodiments.

FIG. 16 illustrates an example process 1600 for implementing a registration script on an endpoint, according to some embodiments. The EDR solution can run the one-time Registration script on the endpoint and return the results back via an API. Then, process 1600 can run a rescan to ensure that the endpoint is now In the desired state.

More specifically, in step 1602, process 1600 can determine that a registration is required, in step 1604, process 1600 can initiate a registration procedure. In step 1606, process 1600 can obtain results of registration. In step 1608, process 1600 can call registration API with results. In step 1610, process 1600 can implement an automated rescan of endpoint. In step 1612, process 1600 can return results from the endpoint.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the disclosed invention may take the form of a computer program product embodied in one or more computer readable media having computer readable program code embodied thereon.

Any combination of one or more computer readable media (for example, a storage system) may be utilized. In the context of this disclosure, a computer readable storage medium may be any tangible or non-transitory medium that can contain, or store a program (for example, a program product) for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

Aspects of the disclosed invention are described above with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor 16, such that the instructions, which execute via the processor, create means for implementing the functions/acts specified in the flowchart and/or block diagram block or blocks.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed by United States patent:

1. A computerized system comprising:
    an access manager server connected to one or more target computer systems, wherein the access manager server is connected to the one or more target computer systems via an Endpoint Detection and Response (EDR) system, and wherein the access manager server is configured to detect that a network line of sight is not available to one or more target computers;
    an EDR system, wherein the EDR system continually monitors and responds to mitigate a cyber threat to the one or more target computer systems, wherein the EDR comprises:
        an EDR control plane that manages and communicates with one or more EDR agents, wherein the EDR control plane causes a specified action in the one or more target computer systems via one or more EDR agents,
        one or more EDR agents that are installed in the one or more target computer systems, wherein the one or more EDR agents are made available via the EDR API, and wherein through the EDR API, the access manager server communicates a request to the EDR control plane to implement various actions, and
        an EDR API that communicates the specified action from the access manager server to the EDR control plane;
    the one or more target computer systems compromises computer devices protected by a set of cyber security specified functionalities implemented by the access manager server.

2. The computer system of claim 1,
    wherein the specified action comprises a specified computer system security action,
    wherein the computer devices comprises a computer hardware device or a computer virtual device, and
    where the set of specified functionalities comprises a set of cyber security functionalities.

3. The computer system of claim 1, wherein the access manager server is configured to detect that the target computer is not using a virtual private network (VPN) to connect to a specified network from a remote location.

4. The computer system of claim 3, wherein the one or more target computers remains exposed to the EDR control plane via an indirect computer network when the access manager server detects that the network line of sight is not available to the one or more target computers.

5. The computer system of claim 4, wherein the access manager server interfaces with the EDR system to execute a specified computer system security action through EDR API.

6. The computer system of claim 4, wherein the access manager server leverages the EDR system to implement an application allow-listing in the one or more target computer systems.

7. The computer system of claim 4, wherein the access manager server leverages the EDR system to implement and/or retrieve data from a process level monitoring and logging operation in the one or more target computer systems.

8. The computer system of claim 4, wherein the access manager server leverages the EDR system to add and remove accounts from permission to access an application in the one or more target computer systems.

9. The computer system of claim 4, wherein the access manager server leverages the EDR system to implement a dynamic privilege management that temporarily gives privileges to a specified user in the one or more target computer systems.

10. The computer system of claim 4, wherein the access manager server leverages the EDR system to implement an account management operation in the one or more target computer systems.

11. The computer system of claim 4, wherein the access manager server leverages the EDR system to implement and/or determine a specified cyber security health state in the one or more target computer systems.

12. The computer system of claim 4, wherein the access manager server leverages the EDR system to implement a geofencing operation in the one or more target computer systems.

13. The computer system of claim 4, wherein the access manager server leverages the EDR system to implement a specified discovery of a risk event operation in the one or more target computer systems.

14. The computerized system of claim 13, wherein the access manager server periodically calls on the EDR API and collects a set of risk event data from the one or more target computer systems using the one or more EDR agents.

15. The computerized system of claim 13, wherein the access manager server causes the EDR system to set an event trigger in the one or mar target computer systems and to notify the access manager server about any specific security events that are detected by EDR agents in the one or more target computer systems that are related to the event trigger.

16. The computer system of claim 4, wherein the access manager server leverages the EDR system to register new endpoints when any new computer systems are added to the one or more EDR systems.

17. The computer system of claim 4, wherein the access manager server leverages the EDR system to provide reports about current managed target computer systems in the one or more EDR systems.

18. The computer system of claim 4, wherein the access manager server leverages the EDR system to revoke Just-In-Time Privileged Access Management (JITA) rights of systems that access the one or more target computer systems.

19. The computer system of claim 1, wherein the access manager server is configured to request that the one or more EDR agents implement the specified task on the target computer when the access manager server detects that the network line of sight is not available to the one or more target computers.

* * * * *

UNITED STATES PATENT AND TRADEMARK OFFICE
CERTIFICATE OF CORRECTION

| | |
|---|---|
| PATENT NO. | : 12,003,545 B2 |
| APPLICATION NO. | : 17/503366 |
| DATED | : June 4, 2024 |
| INVENTOR(S) | : Paul Lanzi et al. |

It is certified that error appears in the above-identified patent and that said Letters Patent is hereby corrected as shown below:

In the Claims

Column 14, Line 9 In Claim 15, delete "mar" and replace it with "more".

Signed and Sealed this
Nineteenth Day of November, 2024

Katherine Kelly Vidal
*Director of the United States Patent and Trademark Office*